United States Patent [19]
Miethig et al.

[11] Patent Number: 5,923,370
[45] Date of Patent: *Jul. 13, 1999

[54] IMAGE SMEAR AND DARK SIGNAL REDUCTION DEVICE AND METHOD

[75] Inventors: Michael Miethig; Charles Russell Smith; Eric Charles Fox, all of Waterloo, Canada; Michael George Farrier, Boyne City, Mich.

[73] Assignee: Dalsa, Inc., Canada

[*] Notice: This patent issued on a continued prosecution application filed under 37 CFR 1.53(d), and is subject to the twenty year patent term provisions of 35 U.S.C. 154(a)(2).

[21] Appl. No.: 08/726,827

[22] Filed: Oct. 8, 1996

[51] Int. Cl.$^6$ .............................. H04N 5/217; H04N 3/14
[52] U.S. Cl. ..................... 348/320; 348/241; 348/314; 348/316; 348/317
[58] Field of Search ..................................... 348/312, 317, 348/320, 241, 242, 243, 248, 249, 314, 311, 322, 323, 324, 316; 257/230, 229, 231, 232, 246

[56] References Cited

U.S. PATENT DOCUMENTS

| | | | |
|---|---|---|---|
| 4,758,895 | 7/1988 | Elabd | 348/320 |
| 5,298,734 | 3/1994 | Kokubo | 348/322 |
| 5,430,481 | 7/1995 | Hynecek | 348/322 |

*Primary Examiner*—Wendy Garber
*Assistant Examiner*—Luong Nguyen
*Attorney, Agent, or Firm*—Banner & Witcoff, Ltd.

[57] ABSTRACT

A fast frame interline transfer charge coupled device imaging sensor includes an imaging section and an storage section. The imaging section includes a plurality of interline transfer registers, each interline transfer register containing a plurality of interline register elements. The imaging section further includes an interline clocking structure, the interline clocking structure including polycrystalline silicon buss lines used as gate electrodes, the polycrystalline silicon buss lines being connected to a metal strapping network, the interline clocking structure causing charge to be transferred between interline register elements of each interline transfer register based on interline clocking signals. The storage section is coupled to the imaging section. The storage section includes a plurality of storage registers, each storage register containing a plurality of storage register elements. The storage section further includes a storage discharge structure and a storage clocking structure. Each storage register element of the storage registers is selectively coupleable through the storage discharge structure to a storage drain. The storage clocking structure has first and second clocking structure parts, the first clocking structure part corresponding to first storage register elements coupled to respective interline registers. The first clocking structure part is coupled to the interline clocking structure so as to cause charge to be transferred from the respective interline registers to the first storage register elements based on the interline clocking signals. The second clocking structure part causes charge to be transferred between storage register elements of each storage register based on frame clocking signals.

30 Claims, 10 Drawing Sheets

IMAGE SMEAR AND DARK SIGNAL REDUCTION DEVICE AND METHOD

BACKGROUND OF THE INVENTION

1. Field of the Invention

The invention relates generally to charge coupled device image sensors and specifically to methods of improving sensor performance by smear signal and dark current signal reduction.

2. Description of Related Art

Charge couple devices (hereinafter CCDs) are widely used in video imaging and recording applications. The architecture of CCD video sensors generally follow the form dictated by the National Television Standards Committee (NTSC) for video broadcast standards. CCD video sensor designs need at least 488 TV lines vertically, 500 to 800 pixels per TV line, have an optical format of 4/3 aspect ratio, and generated field interlaced video at a frame rate of 30 Hz. CCD architectures which achieved the goals of the video format imaging requirements generally fell into two categories: Interline Transfer (ILT) or Frame Transfer (FT) image sensors. Other types of video sensors have also been developed such as full frame (FF), MOS X-Y, and charge injection devices (CID). This invention relates mainly to the ILT and FT image sensors and has little or no relevance to the other forms of video format image sensors.

Frame transfer sensors rely on the integration of an odd or even field of data, the quick transfer of that image field data to an optically opaque analog storage array, and the subsequent parallel to serial transfer of the video data to a camera circuit. An optically opaque storage array is a storage array that is covered by an optically opaque material such as an aluminum film so that the storage array is not photosensitive. The rapid vertical transfer of the image data from integration of the first video field is vital since the optical input onto the imaging section of the CCD sensor is continuous (not strobed or modulated during transfer). However, since vertical transfer requires a finite time to complete, there is always some fraction of image signal from subsequent integration fields collected in the vertical shift register during the field transfer to the storage region. The quantity of signal charge present in the video field which results from integration during the transfer time is said to be a smear signal offset to the proper video signal. Each pixel collects a fraction of the image charge as it rapidly passes through the image while transferring to the storage area. The quantity of smear is measured as a fraction of the nominal signal level and is proportional to the transfer time and the local optical power density. The visual effect of the smear charge, as it appears on a video monitor, is a vertical strip of excess brightness emanating from the bright source in the image. The stripe may be faint or saturated depending on the brightness of the source.

Interline transfer CCD image sensors solved the problem of transferring a field of image data during the integration of the next field of data by using an opaque vertical shift register (i.e., a shift register covered by an opaque material). The opaque vertical shift resigster is disposed adjacent to the photosensitive pixel. Signals from one field of pixels is very rapidly transferred to the vertical register and then transferred in a parallel/serial manner at the normal (60 Hz) field rate. The majority of the smear content is thus eliminated since the image data from the preceding field is shielded by the opaque film disposed over the vertical shift register from further integration during the readout even though the entire array is illuminated with the optical signal from the image plane. The penalty for this improved smear function is the reduction in optical aperture of the individual imaging pixel (by approximately 50%). Thus, the sensitivity of the sensor is diminished by 50%. Additionally, the ILT employs a relatively slow parallel to serial readout rate corresponding to 244 vertical lines read out in $\frac{1}{60}$ sec. Even though the vertical readout registers are most likely shielded from a direct optical signal, the small amount of optical signal which "leaks" (e.g., via a phenomenon known as light piping) into the vertical register during vertical field transfer has substantial integration time to build up unwanted smear signal.

CCD image sensor pixel structures and processes have been continuously improved such that commercially available CCD image sensors used in both consumer camcorders and broadcast video systems have reduced smear content to −90 dB below the nominal signal level. Improved smear performance is realized by several techniques described herein and are used in the current embodiment of the invention. The present invention further improves on the prior art by applying very fast frame transfer techniques and very fast smear signal reset structures to reduce the smear signal content by an additional −20 dB to −30 dB. This smear reduction is accomplished while maintaining optimum optical aperture, signal charge saturation, antiblooming protection, electronic shuttering, and transfer characteristics for the CCD video image sensor.

CCD imaging devices which are comprised of combinations of interline transfer and frame transfer technologies (called frame interline transfer or FIT) have been reported. Such devices have been developed for the proposed HDTV video applications which involve larger, higher resolution arrays, higher data rates, smaller pixel dimensions, and different video signal formats to those of the standard RS170 video format. The prior art applied to HDTV format image sensors does in fact reduce smear signal by quickly clearing the image charge from the vertical interline shift registers into the light shielded frame storage registers. The current invention describes a CCD video image sensor device architecture which demonstrates an improvement over the prior art (FIT) for smear signal reduction.

In addition to the smear signal performance of a CCD sensor, several other performance factors are of concern. CCD image sensors experience thermally generated leakage currents which integrates the potential wells of the CCD shift register. The leakage current results in a background signal level known in the industry as dark current and is usually specified as a current density in nanoamps per square centimeter. The dark current is generated by both surface state and bulk traps or defects in the crystal and typically generate signal carriers (electrons in most CCD's) with a rate which doubles for every 7 degrees C in temperature change. Thus, if the room temperature (25 C) operating condition for dark current density is 1 $nA/cm^2$, then the dark current density at 53 C is 16 nA/cm2. The dark current density is a characteristic of the silicon process and the device structure and may be lowered by reduction of bulk and surface generation sites.

Dark current density which has been established by the CCD processing can be reduced during the CCD operation by employing a clocking scheme for the CCD electrodes known in the industry as multi-pinned phase (MPP) operation. With this method, surface state related dark current electrons are recombined with holes pulled to the surface from the p-type regions adjacent to the CCD channels. Employing the MPP method, as well as various processing techniques, dark current can be minimized to values as low as 0.01 nA/cm2 at 25 C. This value is still finite and non-zero and still is subject to the same doubling rate as the operating temperature of the device increases. As the dark current signal increases the dynamic range or contrast ratio of the CCD sensor is reduced, which reduces the overall system performance.

Another CCD device performance parameter is radiation tolerance. Ionizing radiation sources, such as those found in vacuum space, can create damage to a CCD image sensor over the lifetime of the sensor. Mechanisms for this damage include generation of fixed oxide charge in gates and other insulator regions of the CCD sensor, silicon crystal displacement damage, as well as other effects. Crystal damage and surface state density alterations generally result in increased dark current density and reduced charge transfer efficiency over time. Fixed oxide charge results in threshold shifts, educed amplifier performance, and reduced charge transfer efficiency.

A CCD image sensor designed for the purpose of real time video imaging is generally described as an interlace format interline transfer (ILT) or frame transfer (FT) area imaging device.

The standards for the operation of and physical format of the CCD sensor are described by NTSC standards commonly known as RS170 video broadcast standards. These standards include specifications for image aspect ratio (4:3), number of video lines per picture height, interlacing scheme, and frequencies of operation.

The actual theory, operation, and construction of the CCD image sensor technology is voluminously described in the literature. Salient features of the CCD image sensor technology, as it applies to the current invention will be detailed.

Referring to FIG. 1, a CCD image sensor architecture which conforms to the RS170 video format comprises an interline transfer imaging architecture 11, a horizontal readout register 12, and an output amplifier structure 13. An alternative CCD video image sensor architecture is a frame transfer structure (FIG. 2) comprising a frame transfer imaging section 21, a field storage section 22, a horizontal readout register 23, and an output amplifier structure 24.

In FIG. 1 the interline architecture (hereafter ILT architecture) includes an integration site or pixel 14, a pixel to vertical register transfer region 15, and a vertical transfer register 16. Visible radiation from the imaged scene is focused onto the imaging array 11, and falls on the pixel which is typically a form of silicon photodiode. The pixel may also be constructed of an MOS gated region using doped polysilicon material as a somewhat transparent electrode. The pixel aperture is usually defined by a patterned layer of aluminum. An aluminum layer covers the vertical shift register 16 and reflects the light incident at that location. Light falling on the open pixel is converted to electrons and holes in the silicon substrate. Electrons are collected in potential wells in the silicon substrate formed at the pixel. After the integration time interval the charge from alternate pixels is transferred laterally to a receiving potential well in the vertical shift register. Electrons or signal charge from alternate pixels is transferred in alternate image fields corresponding to the NTSC television monitor scan sequence called interlacing. This transfer is affected by the application of a voltage to the MOS electrodes of the vertical shift register.

Once the charge is transferred to the vertical shift registers, the register electrodes have applied voltages in a clocked sequence such that the signal charge is transferred vertically downward in a line by line fashion. The signal charge is transferred to a horizontal CCD shift register 12 at the bottom of the array. The signal charge is transferred laterally in a serial fashion using voltages applied to the register electrodes in a clocked sequence. The signal charge is then converted to a voltage through a capacitive sense node and then the voltage signal is coupled to the external circuitry through a simple analog amplifier circuit 13.

The parallel to serial transfer of a frame of image information is thus completed in an interlace field sequence with each field having one-half of the number of video lines. The time interval allowed for the sequence to be completed is set by the NTSC standards at 30 frames per second.

Referring to FIG. 2, the frame transfer CCD architecture (hereafter FT architecture) includes an imaging region 21, a field storage region 22, a horizontal readout register 23, and an output amplifier 24. In the FT architecture, the entire imaging region is photoactive and no overlaying aluminum or other light shielding area is defined in the pixel. There are rows of CCD channel regions 25 covered by polysilicon electrodes which are similar in function to the vertical shift register of the ILT device. Integration sites are formed by the application of a static voltages to alternate polysilicon electrodes. Light from the imaged scene is focused onto the imaging array, transmitted through the polysilicon electrodes to create electrons and holes in the silicon substrate, and signal charge is collected in the potential wells of the integration sites. After integration the vertical registers are clocked at high speed into receiving register elements in the field storage section 22. The imaging section is then reset to a static potential. Alternate electrodes from those activated in the first integration are activated in the second field creating integration sites which are displaced by one pixel dimension vertically.

While the second field integration is taking place, the signal charge from the previous field is being transferred in the parallel/serial fashion from the storage register to the horizontal shift register 23 and out through the analog amplifier 24.

Referring to FIGS. 3A and 3B, graphic representations of video imagery are shown. FIG. 3A represents a frame of video imagery 31 with 488 lines of vertical resolution 32 and the corresponding video wave form signal generated at the output of the horizontal shift register. The number of horizontal resolution elements 35 is not established by NTSC standards but is typically 550 to 768 pixels per line. The graphic depicts imagery from a uniformly dark background with a bright target in the scene which is approximately 10% of the picture height.

A video wave form 33 indicates the odd field voltage output wave form from the CCD image sensor. The video signal from the bright object, for example an object located at line N 38, is at a value near to the peak output signal possible from the sensor. The region of video depicted as a white band running vertically is generally described as smear signal and results in unwanted signal in lines above and below the bright object in the scene 34. The amount of smear signal, shown at 37 of video line N 1, is measured from the reference level 36 (i.e., the dark background of the image that would otherwise be the signal corresponding to the particular pixel). The smear signal is usually specified as a fractional percentage of the nominal signal in the region of the bright object. The fractional value of smear signal can be as high as 10% to as little as 0.001% depending on the design of the image sensor pixel and readout structures.

FIG. 3B depicts the same scene as shown in FIG. 3A with the image smear virtually eliminated. Video wave form 38 shows no measurable smear signal as is characteristic of the present invention.

Equally objectionable is a dark signal depicted in FIG. 4. Dark signal 42, adding to background signal 41, is generated by several sources including surface state generation sites the oxide/silicon interface and bulk silicon generation sites. The control of dark current generation largely depends on the details of the silicon processing used as well as the purity of the bulk silicon starting material. The dark current generally results in unwanted background signal charge in the absence of optical input which can be viewed as point sources or collections of point sources in the image. The dark signal may also be seen as a largely uniform voltage offset of the video in the dark with gradual variations across the CCD sensor.

The generation sites for dark current in CCD image sensors generally follow a statistical thermal generation characteristic which predicts a doubling of dark current generation for every 7 degrees centigrade increase in substrate temperature. Thus, CCD image sensors are susceptible to reduction in dynamic range performance and a degradation of the signal to noise ratio when the sensor is subjected to elevated temperatures.

Additionally, dark current generation site density can be increased when the sensor is subjected to ionizing radiation sources such as X-rays and energetic charged particles such as electrons or protons. In vacuum space applications, CCD image sensors can be subjected to ionizing radiation which increases the dark current generation site density gradually over the lifetime of the device.

In the space imaging applications, as well as for other applications, it is necessary to reduce the smear content and the dark current content of the image signal. The invention improves the CCD video imaging technology by reducing the smear content and the dark current content in the imagery using a technique of rapid elimination of the unwanted signal charge during the blank period between the odd and even field readout sequences.

The present invention, the fast frame interline transfer (FFIT) CCD device, demonstrates the capability of simultaneously reducing smear signal and accumulated dark signal, beyond the capabilities of the prior art, through practicing the methods of the invention.

SUMMARY OF THE INVENTION

It is an object of the present invention to reduce smear and dark signal charge in the output signal of frame interline transfer charge coupled device imaging sensors. It is yet another object of the present invention to improve dynamic range performance of imaging sensors that are employed in formats with a vertical blanking interval such as the NTSC standard for television.

These and other objects are achieved in a fast frame interline transfer charge coupled device imaging sensor that includes an imaging section and an storage section. The imaging section includes a plurality of interline transfer registers, each interline transfer register containing a plurality of interline register elements. The imaging section further includes an interline clocking structure, the interline clocking structure including polycrystalline silicon buss lines used as gate electrodes, the polycrystalline silicon buss lines being connected to a metal strapping network, the interline clocking structure causing charge to be transferred between interline register elements of each interline transfer register based on interline clocking signals. The storage section is coupled to the imaging section. The storage section includes a plurality of storage registers, each storage register containing a plurality of storage register elements. The storage section further includes a storage discharge structure and a storage clocking structure. Each storage register element of the storage registers is selectively coupleable through the storage discharge structure to a storage drain. The storage clocking structure has first and second clocking structure parts, the first clocking structure part corresponding to first storage register elements coupled to respective interline registers. The first clocking structure part is coupled to the interline clocking structure so as to cause charge to be transferred from the respective interline registers to the first storage register elements based on the interline clocking signals. The second clocking structure part causes charge to be transferred between storage register elements of each storage register based on frame clocking signals.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
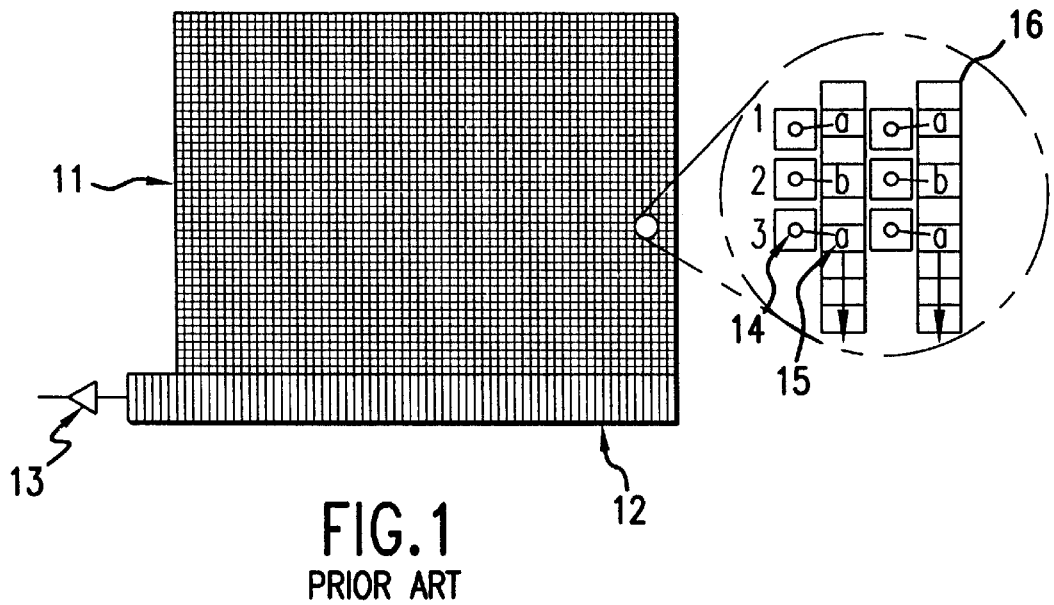
FIG. 1 is a block diagram of an interline transfer CCD video image sensor.
Figure 2:
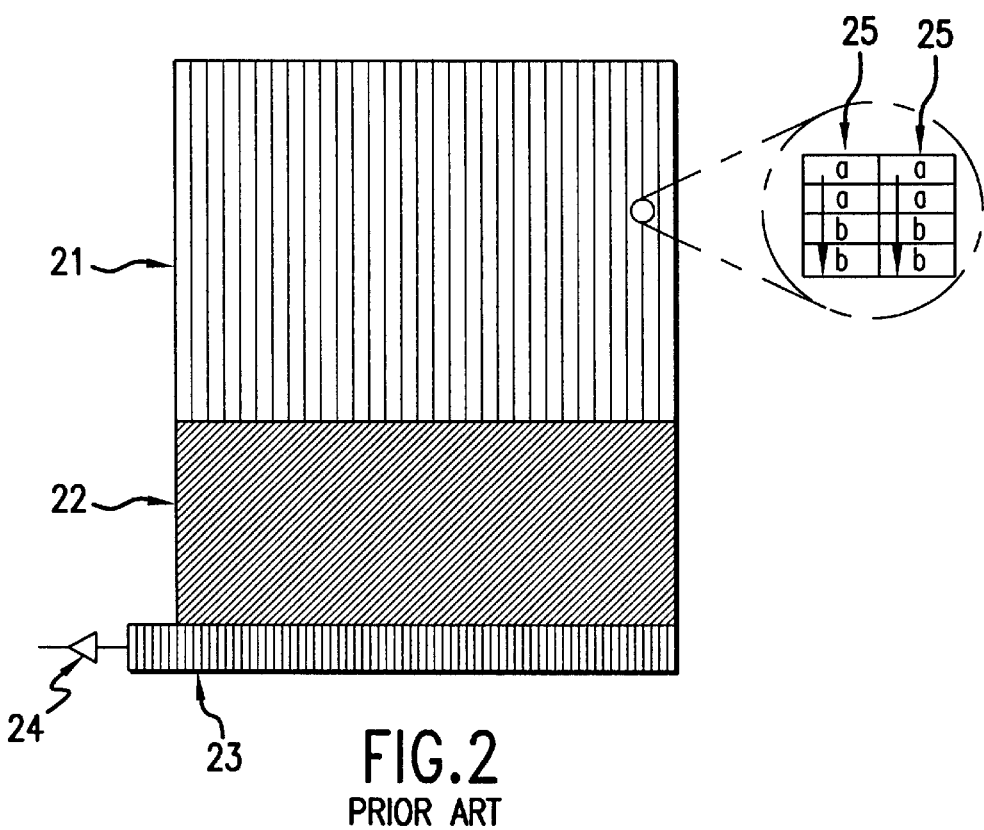
FIG. 2 is a block diagram of a frame transfer video image sensor.
Figure 3A:
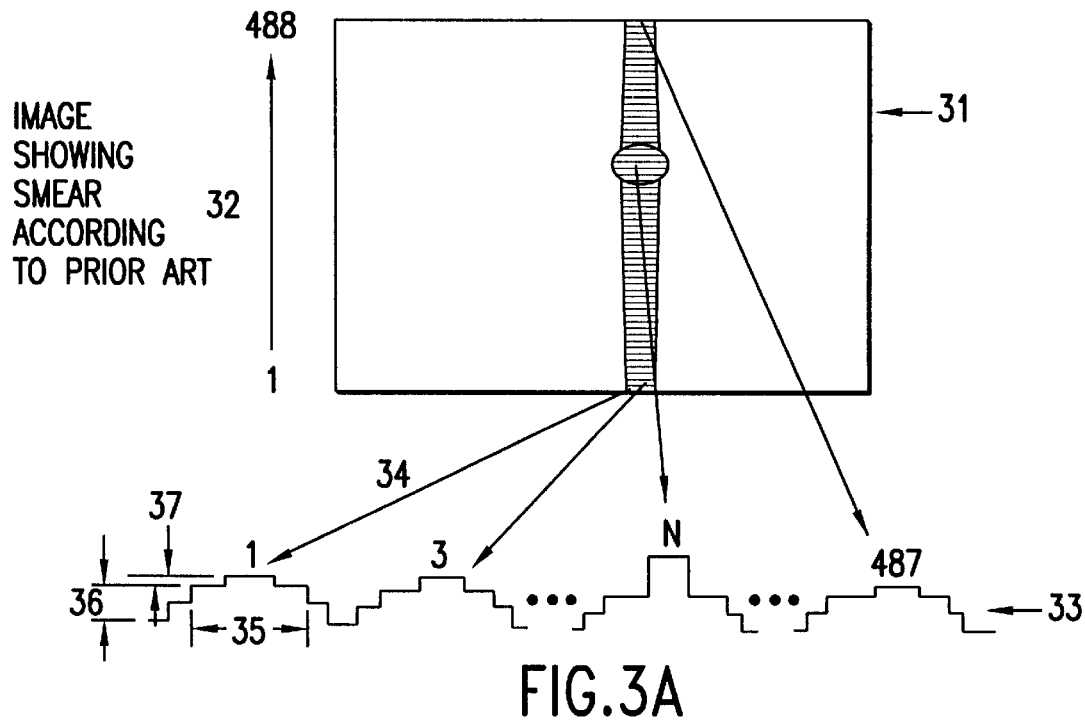
FIGS. 3A and 3B are signal diagram representations of the presence and non-presence, respectively of smear on a video image.
Figure 3B:
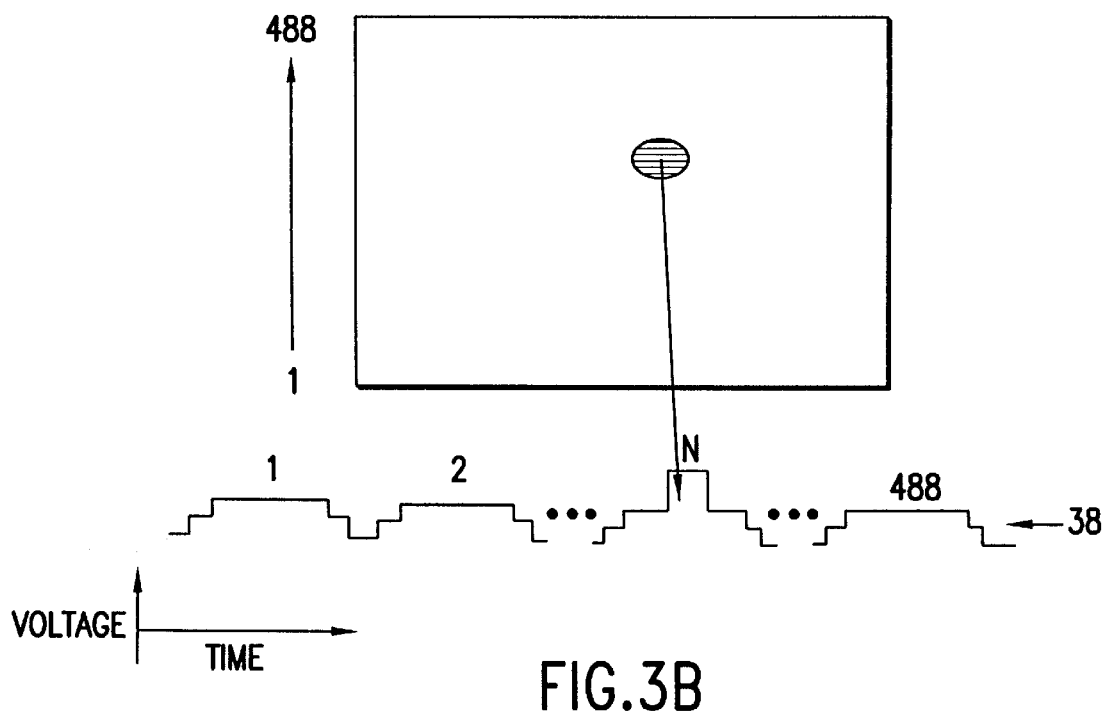
Figure 4:
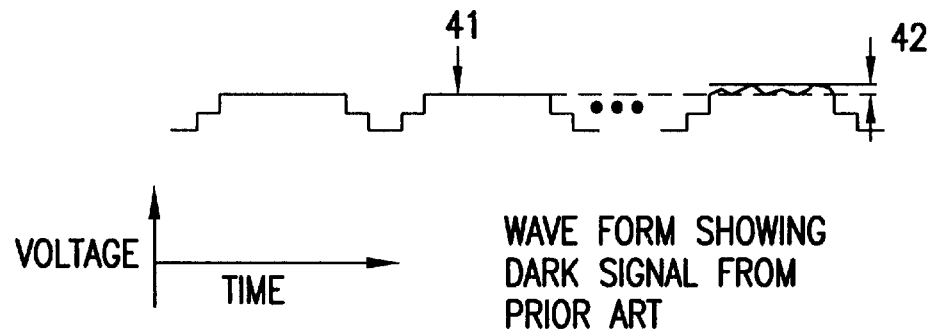
FIG. 4 is a video wave form depicting a dark signal.
Figure 5:
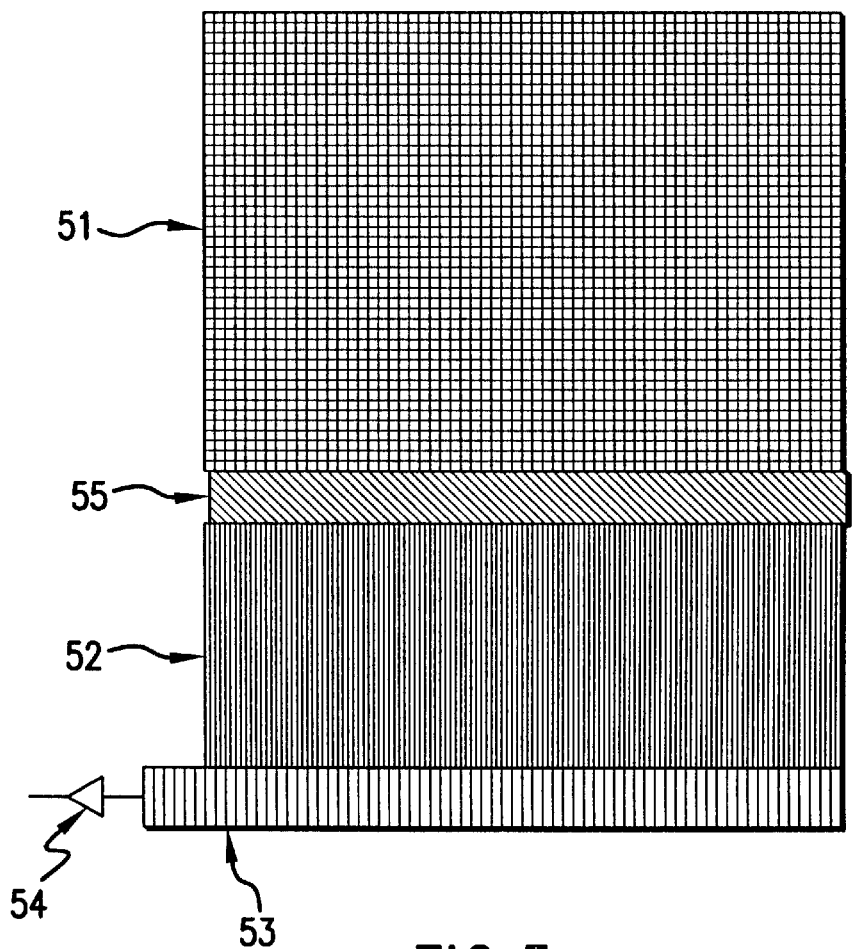
FIG. 5 is a block diagram of FFIT image sensor according to the present invention.

Referring to FIG. 5, a CCD video imaging device is depicted which includes an interline transfer pixel array 51, similar to that described with reference to FIG. 1, a field storage register 52, similar to that described with reference to FIG. 2, a horizontal readout register 53, an output amplifier 54, and a storage isolation section 55. Architecturally, this device is defined as a Frame Interline Transfer CCD imaging device (FIT). Versions of prior art CCD architectures, having an interline transfer pixel array and a field storage register, have been described in the literature for application to the High Definition Television (HDTV) imaging systems. The storage isolation section is not common to the reported HDTV sensors; however, the present invention utilizes the CCD architecture described by FIG. 5 with the inclusion of a charge drain structure within the storage and storage isolation sections. Additionally, metal bus structures on the imaging and storage array renders the device capable of very high speed clocking of the vertical and storage register elements in a burst mode which is signified by the naming of the technology disclosed herein as Fast Frame Interline Transfer (FFIT) CCD image sensor technology.

The FIT CCD architecture has been successfully used to reduce smear in HDTV sensors to a value of −100 dB or 0.001% of the nominal signal output. The pixel design for the FIT sensor utilizes advanced device design and silicon processing capabilities to minimize the causes of image smear in an image sensor.

FIGS. 6A–6E describe a cross section of the Fast Frame Interline Transfer pixel region with the potential wells appropriate for operation and coincident with the timing diagram included.

Figure 6A:
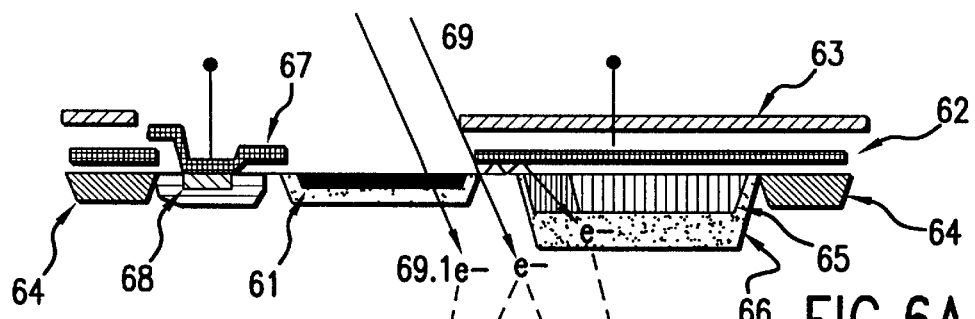
FIGS. 6A–6E are potential well and timing diagrams depicting an imaging section according to the present invention.

In FIG. 6A, the cross section of the interline transfer pixel (in the imaging section) is shown as a pinned photodiode 61, polysilicon gate electrode 62 over an insulating gate nitride/oxide, a metal light shield 63, implanted channel stops 64, a buried channel 65 (forming a part of a vertical shift register), a shallow p-tub 66. an antiblooming/exposure control (AB/EC) gate 67, and an N+ diode 68 connected to the AB/EC gate formed in a barrier region. The entire structure is fabricated on a p− epitaxial structure on a p+ silicon substrate.

Incident optical energy or visible photons 69 from the image are focused onto the CCD image sensor and are absorbed in the bulk silicon region through the aperture defined by the aluminum light shield. Electrons 69.1 and holes are generated in the silicon bulk at various depths depending on the wavelength of the light. Electrons are collected in the potential wells capacitively established in the polysilicon gated regions and under the pinned photodiode region.

Figure 6B:
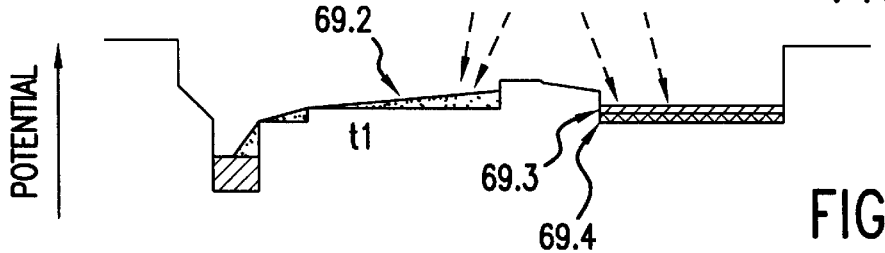
Figure 6C:
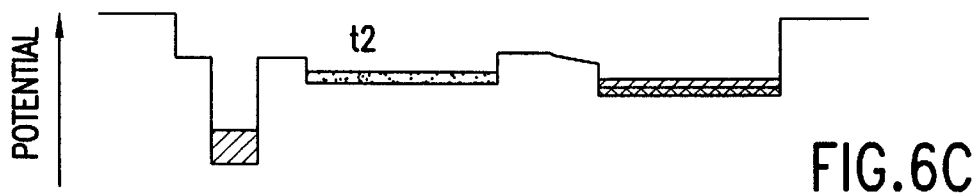
Figure 6D:
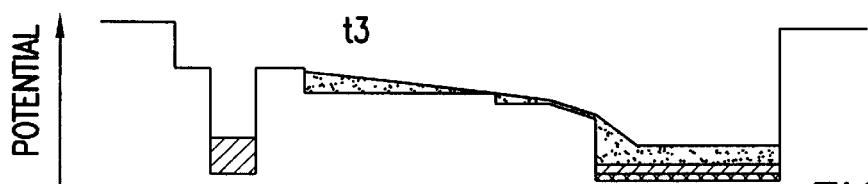
Figure 6E:
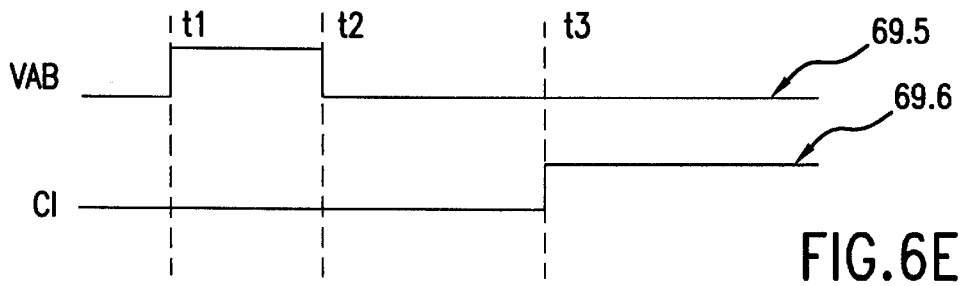

FIG. 6B shows the potential in the silicon corresponding to the time interval t1 in FIG. 6E. The potential at the AB/EC junction and gate are held at a high potential relative to the adjacent pinned photodiode potential such that the electrons accumulated in the well 69.2 formed in the integration site are caused to be eliminated in the N+ diode drain. This condition, created by applying anti-blooming voltage VAB (69.5 of FIG. 6E) to gate electrode 67, is described as being in exposure control mode where all the signal charge generated during the t1 period of time is drained away into diode 68.

Smear charge 69.3 and dark signal charge 69.4 can accumulate during this period as well as during the integration period (shown in FIG. 6C during time t2).

The smear charge is created by several means. One is the multiple reflection of incident light between the light shield and the silicon substrate. Electrons are generated and collected directly in the vertical shift register. This effect is known in the industry as light piping and can be responsible for a significant fraction of the smear charge generation. Secondly, electrons which are generated deep in the substrate beyond the depletion regions of the formed potential wells are free to drift toward the nearest potential well. Some fraction of the drift electrons can be collected by the vertical shift register. The collection of the drift electrons is greatly reduced by the presence of a small potential barrier resulting from p-tub region surrounding the buried channel.

During the integration period in FIG. 6C, described in the timing diagram (FIG. 6E) as t2, signal charge is collected in the well defined by the pinned photodiode. Some fraction of the signal charge is collected directly by the vertical shift register as smear charge (and dark signal charge). The percentage of smear charge as a fraction of the image signal is defined by the pixel cross section and increases linearly with a decrease in integration time. This is because the smear signal (and dark signal) is generated at a constant rate independent of the integration time while the signal charge collected in the integration well is dependent on the fraction of time within the frame time that the pixel is in integration mode.

During the transfer period in FIG. 6D, described in the timing diagram (FIG. 6E) as t3, the integration is complete and the transfer of signal charge from the pixel is commenced by applying clock voltage C1 (69.6 of FIG. 6E) to gate electrode 62. In the prior art of CCD image sensor design, the signal charge from the image would then be added to the smear charge and dark signal already present in the vertical shift register. The present invention eliminates most of the accumulated smear and dark signal charge in the vertical shift register just prior to the time period t3 such that image signal charge is transferred to an empty vertical register well (e.g., 65 in FIG. 6A). The unwanted smear and dark signal charge is eliminated by rapidly clocking the vertical shift registers into the storage registers where the unwanted charge is drained through a gate controlled drain circuit in the storage cell.

Figure 7A:
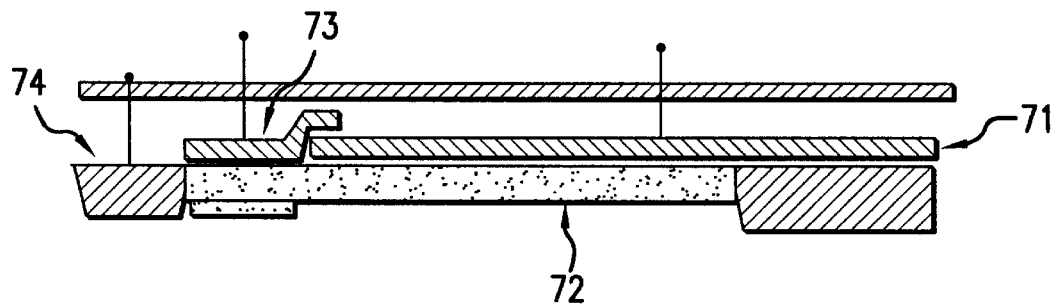
FIGS. 7A–7D are potential well and timing diagrams depicting storage and isolation sections of the present invention.
Figure 7B:
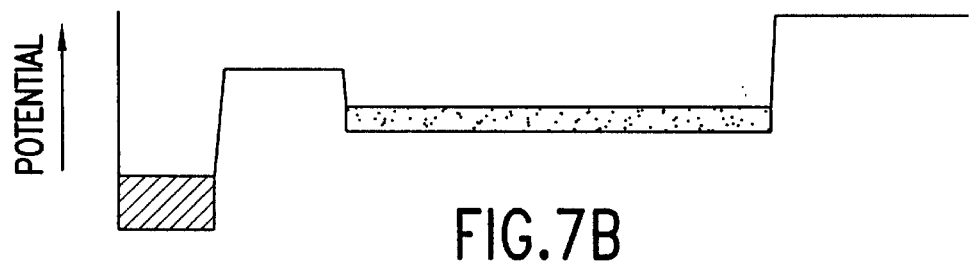
Figure 7C:
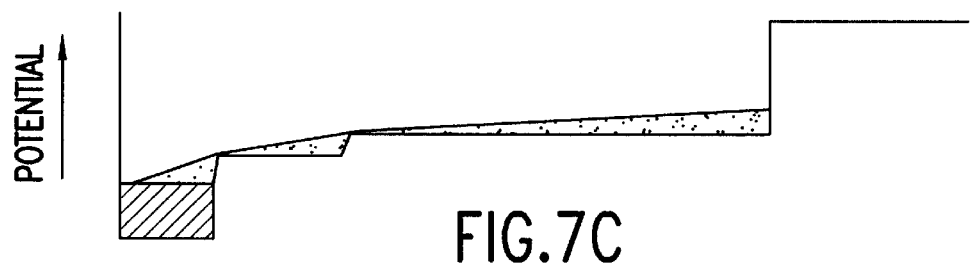
Figure 7D:
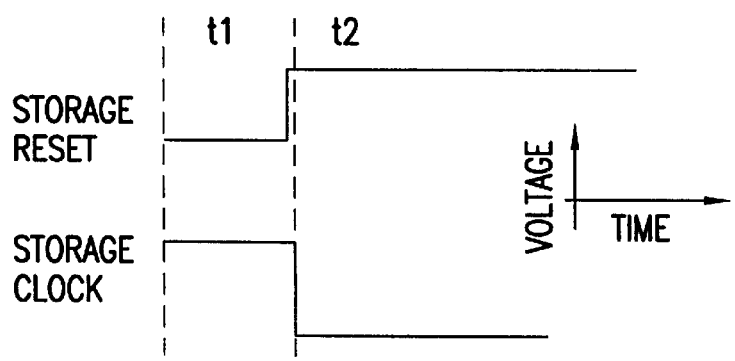

In FIG. 7A, a cross section of a storage and isolation register cell is depicted. It is formed with polysilicon gate electrodes 71 over CCD buried channel 72, bordered by a storage reset gate 73, and a drain diode 74. FIGS. 7B, 7C and 7D show how charge in the isolation and storage registers are drained of unwanted charge. During time period t1 (FIG. 7D), the storage register well is enabled by applying no storage reset voltage (FIG. 7D) to reset gate 73 (FIG. 7A) while applying storage clock voltage (FIG. 7D) to gate electrode 71 (FIG. 7A) so that the barrier created at the reset gate is in the off (low voltage) mode. During time t2, the barrier to the drain diode is eliminated by applying the storage reset voltage (FIG. 7D) to reset gate 73, and the charge in the storage register is drained. This drain sequence occurs during the short time interval just before the end of the integration period and before the transfer of charge from the pixels into the vertical shift registers. The unwanted smear charge is drained into the isolation and/or storage register drains such that there is no mixing of smear signal with the image signal. Similarly, the dark signal which has accumulated during the integration period is also drained through the isolation and storage register drains.

Figure 8:
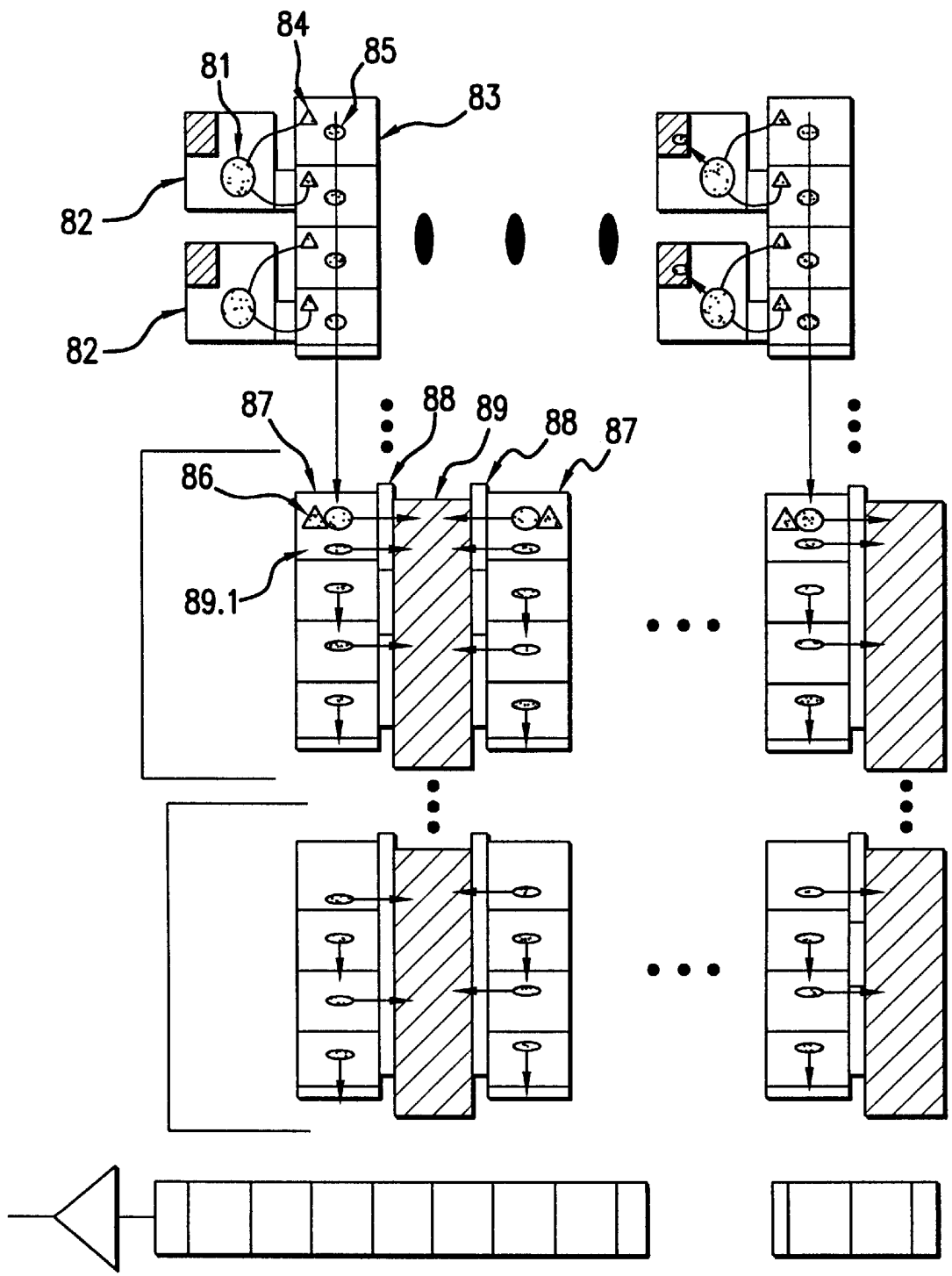
FIG. 8 is a functional schematic diagram depicting image charge transfer with smear and dark signal elimination.

FIG. 8 illustrates the movement of signal, smear, and dark current charges during the integration and rapid elimination of the unwanted signal charges. Desired signal charge 81 from the image is collected in the pixel integration site 82. A fraction of the signal charge is lost to the vertical shift register 83 as smear charge 84. Additionally, dark signal charge 85 is being accumulated in the vertical shift register. The combined smear charge and dark signal charge 86 is rapidly transferred down to the isolation storage registers 87 as undesired smear and dark signal charge 86. There the storage register reset gate 88 is held high and the smear and dark current charge from the vertical registers are drained into the n+ diode 89. Additionally, the dark signal 89.1 accumulated in the isolation storage register 87 is eliminated through the lateral storage drain structure 88, 89.

Figure 12:
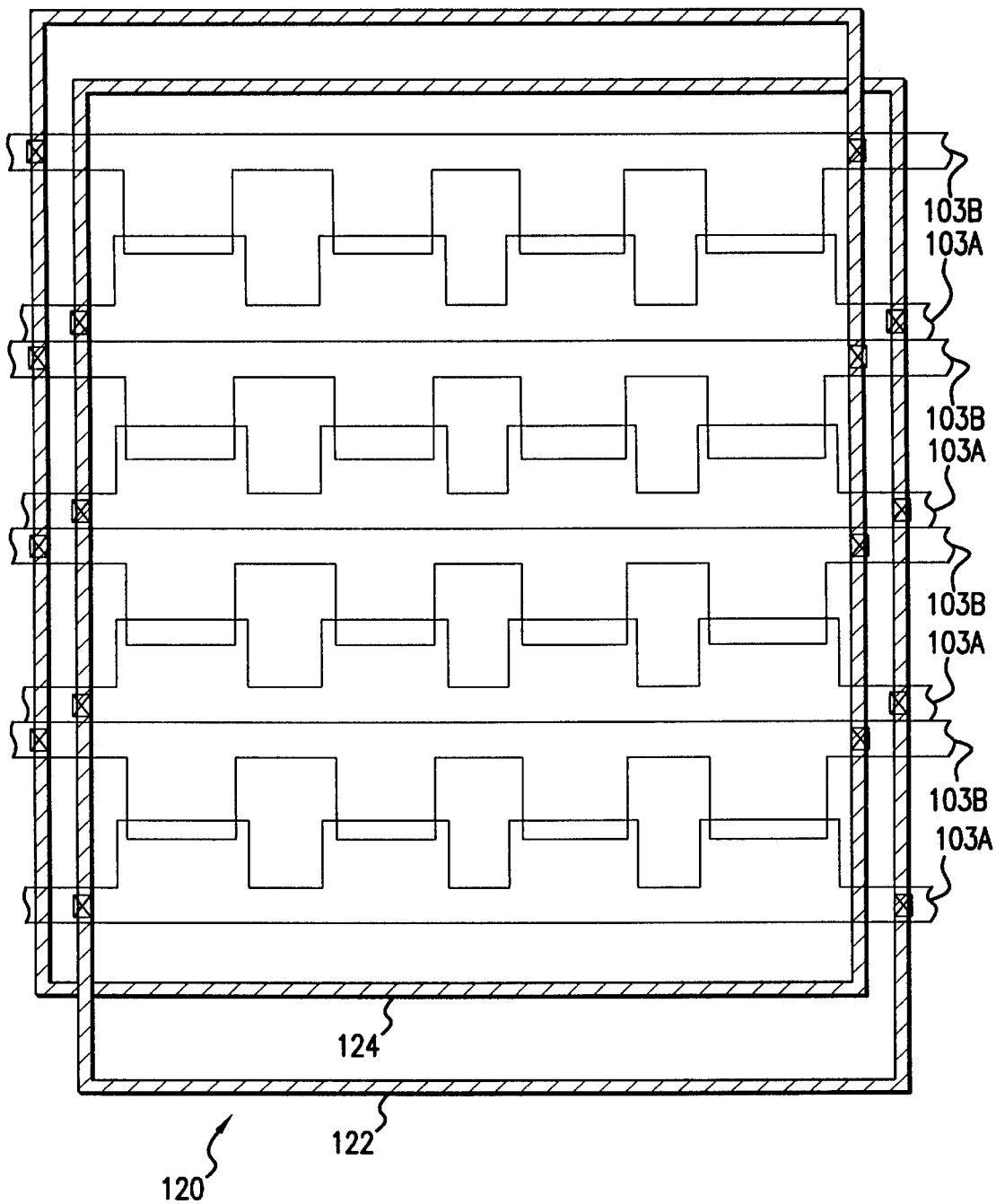
FIG. 12 is a metal strapped CCD gate structure.

The design of the vertical shift register of the ILT pixel region incorporates a metal strapped CCD gate structure 120 (FIG. 12). The metal strapping 122, 124 of the polysilicon gate buss structures 103A, 103B dramatically reduces the resistive load on the clock drivers and shortens the RC time constant of the vertical register such that the vertical register clocks may be operated, in a burst mode, at greater than 10 MHz. The entire 244 lines per field may be rapidly transferred to the isolation storage registers (e.g. 55 of FIG. 5) during the vertical blanking period of an NTSC formatted signal. Thus, the smear and accumulated dark signal may be drained rapidly. Similarly, the image may be rapidly transferred to the optically opaque (shielded) field storage registers (e.g. 52 of FIG. 5) such that the minimum amount of smear charge will be collected during the pixel to vertical register transfer and the vertical transfer to the field storage registers.

The resulting reduction of the smear charge content in the display, over that observed on known CCD ILT video image sensors, is calculated to be −54 dB. CCD sensor devices employing the prior art have a vertical readout rate of 14 KHz which results in 71.4 microseconds of integration of smear charge per line. Using the present invention to clear all accumulated smear charge prior to the rapid transfer of the image through the vertical registers and into the field storage registers at a 7 MHz rate, the resultant integration time is only 0.143 microseconds. Thus, the ratio of the two smear integration times results in a factor of 500 or −54 dB reduction in smear charge accumulation.

Figure 9:
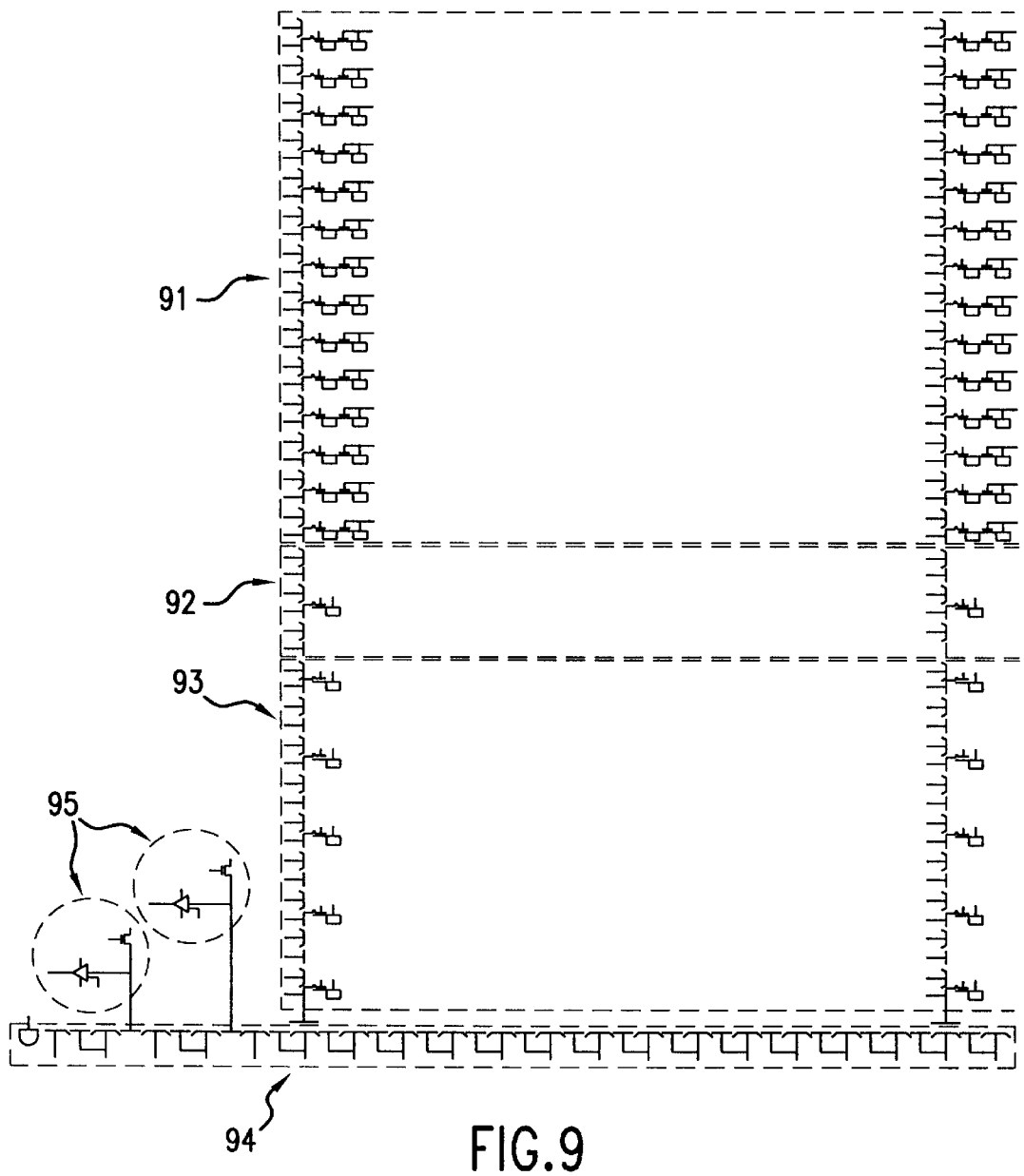
FIG. 9 is a schematic diagram of an embodiment of the present invention.

FIG. 9 depicts the block diagram of the current embodiment of the invention. The FFIT CCD image sensor includes an interline transfer imaging section 91 of 449 (vertical) by 804 (horizontal) imaging elements. Seven lines and thirty-two columns are opaque for dark signal reference. There is a storage isolation section 92 having 8×804 elements, and a field storage section 93 having 250×804 elements. Sections 92 and 93 are substantially the same; however, sections 92 and 93 have separately controllable clock structures (via gate electrodes 71 of FIG. 7A) and separately controllable reset gates (reset gate 73 of FIG. 7A).

There is a horizontal CCD readout register 94 with 1×808 register elements, four of which are dark current isolation elements. There are two output amplifier circuits described as resettable floating gate amplifiers.

Figure 10:
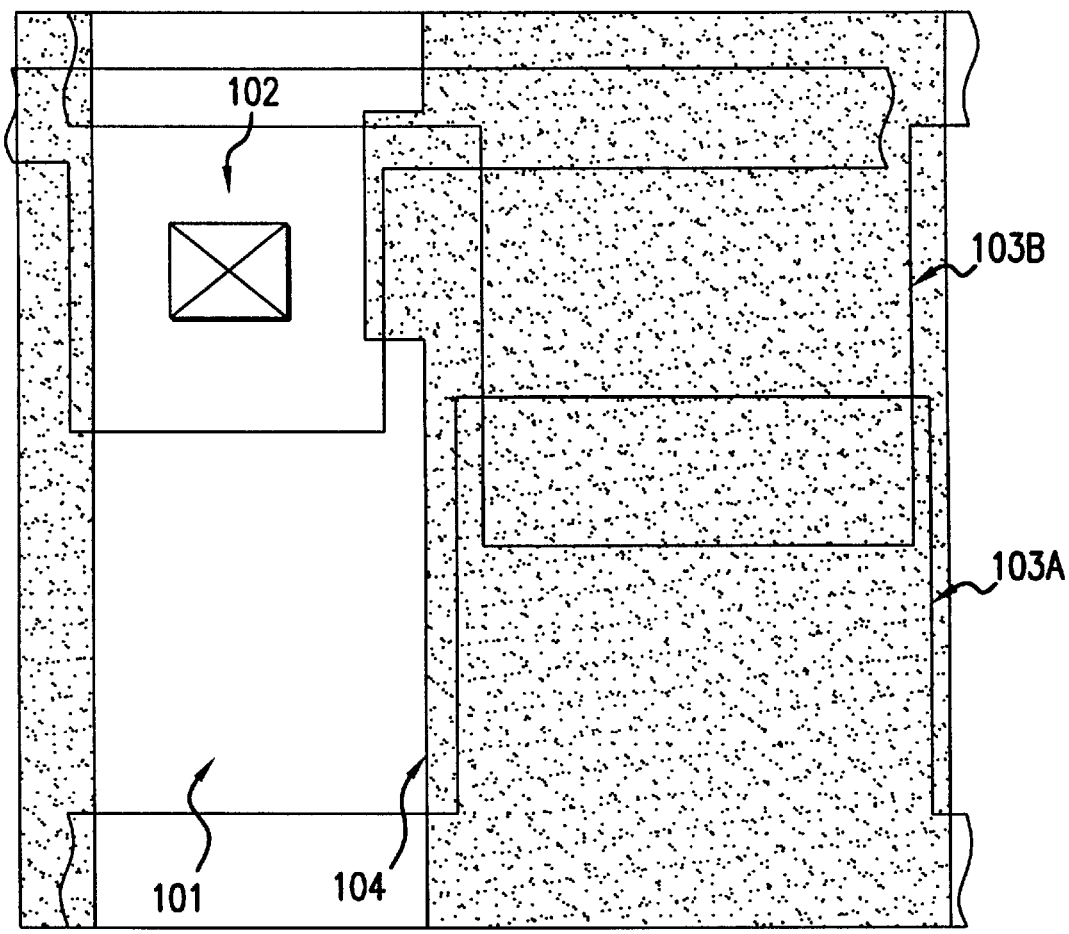
FIG. 10 is a layout of an imaging pixel in the present invention.

FIG. 10 is a plan view depicting the layout of the unit cell of the ILT imaging section of the FFIT CCD sensor. Shown are the pinned photodiode region 101, the antiblooming/exposure control gate and diode region 102, the polysilicon gate structures which function as the vertical register gates and bus structure 103A, 103B, and the location of the opaque metal (aluminum) light shield 104 which defines the optical aperture of the pixel. Not shown are the metal strapping of the vertical bus lines which have been describe elsewhere. Other details of the CCD device structure are also omitted for clarity.

Figure 11:
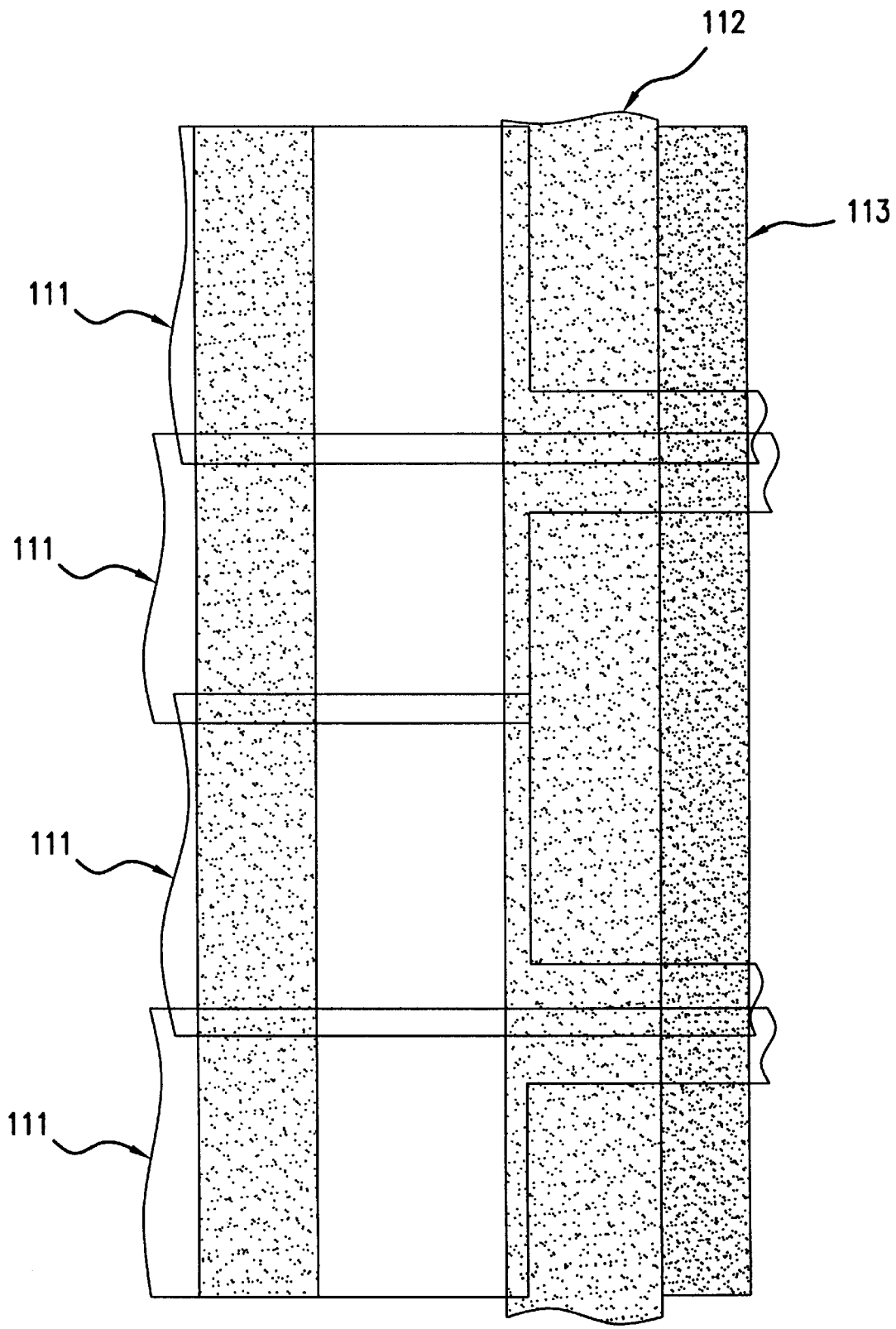
FIG. 11 is a layout of storage isolation cell in the present invention.

FIG. 11 is a plan view depicting the layout of the storage and storage isolation unit cells. Shown are the polysilicon electrodes functioning as the storage register gates and bus structure 111, the polysilicon gate 112 which acts as the reset gate for the isolation storage register and similarly for the field storage register, and the N+ drain diode 113.

Having described preferred embodiments of a novel device for and method of smear and dark signal elimination in a fast FIT CCD sensor (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by letters patent is set forth in the appended claims.

What is claimed is:

1. A charge coupled device comprising:

an imaging section, the imaging section including a plurality of interline transfer registers, each interline transfer register containing a plurality of interline register elements, the imaging section further including an interline clocking structure, the interline clocking structure including polycrystalline silicon buss lines used as gate electrodes, the polycrystalline silicon buss lines being connected to a metal strapping network, the interline clocking structure causing charge to be transferred between interline register elements of each interline transfer register based on interline clocking signals; and a storage section coupled to the imaging section, the storage section including a plurality of storage registers, each storage register containing a plurality of storage register elements, the storage section further including a storage discharge structure and a storage clocking structure, each storage register element of the storage registers being selectively coupleable through the storage discharge structure to a storage drain at the same time, the storage clocking structure having first and second clocking structure parts, the first clocking structure part corresponding to first storage register elements coupled to respective interline registers, the first clocking structure part being coupled to the interline clocking structure so as to cause charge to be transferred from the respective interline registers to the first storage register elements based on the interline clocking signals, the second clocking structure part causing charge to be transferred between storage register elements of each storage register based on frame clocking signals.

2. The charge coupled device of claim 1 further comprising:

storage clocking circuitry for providing the storage clocking signals according to a line output transfer rate; and interline clocking circuitry for providing the interline clocking signals at an interline register transfer rate, the interline register transfer rate being greater than the line output transfer rate.

3. The charge coupled device of claim 2, wherein:

the charge coupled device further includes control circuitry for controlling the interline clocking circuitry and the storage discharge structure; and at a time prior to an end of an integration period, the control circuitry operates the interline clocking circuitry to provide the interline clocking signals and operates the storage discharge structure to couple the first storage register elements of the storage registers to the storage drain.

4. The charge coupled device of claim 2, wherein:

the imaging section further includes an array of photo-sites;

the imaging section further includes photo-site transfer circuitry for transferring contents of at least a part of the array of photo-sites to the plurality of interline transfer registers;

the charge coupled device further includes control circuitry for controlling the storage clocking circuitry, the interline clocking circuitry, and the photo-site transfer circuitry; and at a time after an end of an integration period, the control circuitry operates the photo-site transfer circuitry to transfer the contents of the part of the array of photo-sites into the interline register elements of the interline transfer registers, and then the control circuitry operates the interline clocking circuitry to provide the interline clocking signals and operates the storage clocking circuitry to provide the storage clocking signals so that contents of the interline transfer registers are transferred into the storage registers.

5. The charge coupled device of claim 2, wherein:

the imaging section further includes an array of photo-sites;

the imaging section further includes photo-site transfer circuitry for transferring contents of at least a part of the array of photo-sites to the plurality of interline transfer registers;

the charge coupled device further includes control circuitry for controlling the storage discharge structure, the storage clocking circuitry, the interline clocking circuitry, and the photo-site transfer circuitry;

at a time prior to an end of an integration period, the control circuitry operates the interline clocking circuitry to provide the interline clocking signals and operates the storage discharge structure to couple the first storage register elements of the storage registers to the storage drain; and at a time after the end of the integration period, the control circuitry operates the photo-site transfer circuitry to transfer the contents of the part of the array of photo-sites into the interline register elements of the interline transfer registers, and then the control circuitry operates the interline clocking circuitry to provide the interline clocking signals and operates the storage clocking circuitry to provide the storage clocking signals so that contents of the interline transfer registers are transferred into the storage registers.

6. In a charge coupled device with a horizontal output register, an imaging structure comprising:

an imaging section, the imaging section including an interline transfer register, the interline transfer register including an interline clocking structure, the interline clocking structure including polycrystalline silicon buss lines used as gate electrodes, the polycrystalline silicon buss lines being connected to a metal strapping network, the interline clocking structure causing charge to be transferred from the interline transfer register based on interline clocking signals applied to the interline clocking structure;

an isolation storage section including an isolation storage register coupled to the interline transfer register, the isolation storage register including an isolation storage discharge structure and an isolation storage clocking structure, the isolation storage register being coupleable through the isolation storage discharge structure to a storage drain; and a frame storage section including a frame storage register coupled between the isolation storage register and the horizontal output register, the frame storage register including a frame storage discharge structure and a frame storage clocking structure, the frame storage register being coupleable through the frame storage discharge structure to the storage drain at the same time as the isolation storage register is coupled to the storage drain, wherein the isolation storage clocking structure is coupled to the interline clocking structure so as to cause charge to be transferred from the interline transfer register to the isolation storage register based on the interline clocking signals, the interline clocking signals being characterized by an interline clocking rate, wherein the frame storage clocking structure causes charge to be transferred from the frame storage register to the horizontal output register at a frame clocking rate based on frame clocking signals applied to the frame clocking structure while charge is transferred from the interline transfer register to the isolation storage register at the interline clocking rate, the frame clocking rate being slower than the interline clocking rate.

7. The structure of claim 6 further including a control circuit wherein:

the control circuit operates in a smear reduction mode; and during the smear reduction mode, the control circuit generates the interline clocking signals to sequentially transfer smear charge from the interline transfer register to the isolation storage register while controlling the isolation storage discharge structure so as to discharge the smear charge into the storage drain.

8. The structure of claim 7, wherein:

the control circuit further operates in a transfer mode; and during the transfer mode, the control circuit generates the interline clocking signals and the frame clocking signals at the interline clocking rate to sequentially transfer signal charge from the interline transfer register to the frame storage register while controlling the isolation storage discharge structure so as to discharge none of the signal charge into the storage drain.

9. The structure of claim 6, wherein the interline clocking rate is greater than 10 MHz while the frame clocking rate is defined by data rate requirements of the horizontal output register needed to satisfy image output format.

10. The structure of claim 7, wherein:

the isolation storage register includes a storage element with a potential well characterized by an empty potential;

the isolation storage discharge structure includes a channel defined between the storage drain and the potential well and a gate electrode disposed over the channel; and during the smear reduction mode, the control circuit applies a voltage to the gate electrode so that a potential developed in the channel is a potential within a range between the empty potential of the potential well and a potential of the storage drain.

11. A charge coupled device comprising:

an interline imaging section;

a storage isolation section coupled to the interline imaging section and including plural isolation registers, each isolation register including plural register elements;

a field storage section coupled to the storage isolation section;

a storage discharge structure; and a storage drain selectively coupleable through the storage discharge structure to all register elements of all isolation registers at the same time.

12. The charge coupled device of claim 11, wherein the storage discharge structure includes a lateral gate structure coupled between the storage drain and all register elements of all isolation registers.

13. A charge coupled device comprising:

an interline imaging section;

a storage isolation section coupled to the imaging section;

a field storage section coupled to the storage isolation section and including plural field storage registers, each field storage register including plural register elements;

a storage discharge structure; and a storage drain selectively coupleable through the storage discharge structure to all register elements of all field storage registers at the same time.

14. The charge coupled device of claim 13, wherein the storage discharge structure includes a lateral gate structure coupled between the storage drain and all register elements of all field storage registers.

15. The charge coupled device of claim 13, wherein:

the storage isolation section includes plural isolation registers, each isolation register including plural register elements; and the storage drain is selectively coupleable through the storage discharge structure to each register element of each isolation register.

16. The charge coupled device of claim 15, wherein the storage discharge structure includes a lateral gate structure coupled between the storage drain and all register elements of both all field storage registers and all isolation registers.

17. The charge coupled device of claim 11, 12, 13, 14, 15 or 16, further including a control circuit wherein:

the interline imaging section includes an interline clocking structure; and the storage isolation section includes a storage isolation clocking structure;

the control circuit provides clocking signals in a first mode to the interline and storage isolation clocking structures to transfer smear and dark signal charge from the interline imaging section to the storage isolation section while controlling the storage discharge structure to discharge the smear charge into the storage drain; and the control circuit provides the clocking signals in a second mode to the interline and storage isolation clocking structures to transfer image signal charge from the interline imaging section into and through the storage isolation section while controlling the storage discharge structure to block any discharge of the image signal charge into the storage drain.

18. The charge coupled device of claim 17, wherein:

the field storage section includes a field storage clocking structure;

the control circuit controls the storage discharge structure to discharge the smear and dark signal charge into the storage drain while providing the clocking signals in the first mode to the field storage clocking structure; and the control circuit controls the storage discharge structure to block any discharge of the image signal charge into the storage drain while providing the clocking signals in the second mode to the field storage clocking structure.

19. The charge coupled device of claim 18, wherein:

the interline imaging section includes photo-sites that accumulate image signal charge during an integration period;

the control circuit provides the clocking signals in the first mode before an end of the integration period;

the control circuit provides the clocking signals in the second mode after the end of the integration period; and the control circuit provides the clocking signals in a third mode after providing the clocking signals in the second mode to transfer the image signal charge from the field storage section to the horizontal output register while controlling the storage discharge structure to block any discharge of the image signal charge into the storage drain.

20. The charge coupled device of claim 19, wherein a rate of the clocking signals in the first mode is greater than 10 MHz and a rate of the clocking signals in the third mode is defined by data rate requirements of the horizontal output register needed to satisfy image output format.

21. The charge coupled device of claim 11, 12, 13, 14, 15 or 16, further including a control circuit wherein:

the field storage section includes a field storage clocking structure;

the control circuit provides clocking signals in a first mode to the field storage clocking structure to transfer smear and dark signal charge from the storage isolation section through the field storage section while controlling the storage discharge structure to discharge the smear and dark signal charge into the storage drain; and the control circuit provides the clocking signals in a second mode the field storage clocking structure to transfer image signal charge from the storage isolation section into the field storage section while controlling the storage discharge structure to block any discharge of the image signal charge into the storage drain.

22. The charge coupled device of claim 21, wherein:

the interline imaging section includes photo-sites that accumulate image signal charge during an integration period;

the control circuit provides the clocking signals in the first mode before an end of the integration period;

the control circuit provides the clocking signals in the second mode after the end of the integration period; and the control circuit provides the clocking signals in a third mode after providing the clocking signals in the second mode to transfer the image signal charge from the field storage section to the horizontal output register while controlling the storage discharge structure to block any discharge of the image signal charge into the storage drain.

23. The charge coupled device of claim 11, 12, 13, 14, 15 or 16, further including a control circuit wherein:

the interline imaging section includes an interline clocking structure; and the storage isolation section includes a storage isolation clocking structure;

the control circuit provides clocking signals in a first mode to the interline and storage isolation clocking structures to transfer smear and dark signal charge from the interline imaging section to the storage isolation section while controlling the storage discharge structure to discharge the smear charge into the storage drain;

the control circuit provides the clocking signals in a second mode to the interline and storage isolation clocking structures to transfer image signal charge from the interline imaging section into and through the storage isolation section while controlling the storage discharge structure to block any discharge of the image signal charge into the storage drain; and the clocking signals in the first mode are characterized by a rate that is greater than 10 MHz.

24. The charge coupled device of claim 11, 12, 15 or 16 further comprising a control circuit, wherein:

the storage drain is characterized by a drain potential;

the control circuit controls the register elements of a first isolation register to form corresponding potential wells characterized by an empty potential;

the storage discharge structure includes a channel defined between the storage drain and the register elements of the first isolation register and further includes a gate electrode disposed over the channel; and during a first mode, the control circuit applies a voltage to the gate electrode so that a potential developed in the channel is a potential within a range between the empty potential and the drain potential.

25. The charge coupled device of claim 13, 14, 15 or 16 further comprising a control circuit, wherein:

the storage drain is characterized by a drain potential;

the control circuit controls the register elements of a first field storage register to form corresponding potential wells characterized by an empty potential;

the storage discharge structure includes a channel defined between the storage drain and the register elements of the first field storage register and further includes a gate electrode disposed over the channel; and during a first mode, the control circuit applies a voltage to the gate electrode so that a potential developed in the channel is a potential within a range between the empty potential and the drain potential.

26. In a charge coupled device having an interline imaging section and a storage isolation section with plural isolation registers, each isolation register having plural register elements, a method comprising steps of:

clocking the interline imaging section and the register elements of the isolation registers during a smear reduction mode to transfer smear charge into the register elements of the isolation registers; and discharging the smear charge in all register elements of the isolation registers through a storage isolation discharge structure into a storage isolation drain at the same time during the smear reduction mode.

27. In a charge coupled device having an interline imaging section and a field storage section with plural field storage registers, each field storage register having plural register elements, a method comprising steps of:

clocking the interline imaging section and the register elements of the field storage registers during a smear reduction mode to transfer smear charge into the register elements of the field storage registers; and discharging the smear charge in all register elements of the field storage registers through a field storage discharge structure into a field storage drain at the same time during the smear reduction mode.

28. The method of claim 27 comprising further steps of:

clocking plural register elements of plural isolation registers of a storage isolation section during the smear reduction mode to transfer the smear charge into the register elements of the isolation registers; and discharging the smear charge in all register elements of the isolation registers through a storage isolation discharge structure into a storage isolation drain during the smear reduction mode.

29. The method of claim 26 or 28, comprising further steps of:

clocking the register elements of the isolation registers during an image transfer mode to transfer image charge from the interline imaging section through the register elements of the isolation registers; and preventing the image charge in each register element of the isolation registers from being discharged through the storage isolation discharge structure into the storage isolation drain during the image transfer mode.

30. The method of claim 27 or 28, comprising further steps of:

clocking the register elements of the field storage registers during an image transfer mode to transfer image charge from the interline imaging section into the register elements of the field storage registers; and preventing the image charge in each register element of the field storage registers from being discharged through the field storage discharge structure into the field storage drain during the image transfer mode.

* * * * *